United States Patent [19]

Braddy

[11] 4,303,374
[45] Dec. 1, 1981

[54] FILM COOLED AIRFOIL BODY

[75] Inventor: Bruce T. Braddy, Boxford, Mass.

[73] Assignee: General Electric Company, Lynn, Mass.

[21] Appl. No.: 969,914

[22] Filed: Dec. 15, 1978

[51] Int. Cl.³ ............................................. F01D 5/18
[52] U.S. Cl. .................................. 416/97 R; 415/115
[58] Field of Search ................... 416/97, 92, 96, 96 A; 415/115

[56] References Cited

U.S. PATENT DOCUMENTS

| | | | |
|---|---|---|---|
| 3,370,829 | 2/1968 | Banthin et al. | 416/97 X |
| 3,420,502 | 1/1969 | Howald | 416/97 X |
| 3,423,069 | 1/1969 | Chandley | 416/92 |
| 3,527,543 | 9/1970 | Howald | 416/90 |
| 3,799,696 | 3/1974 | Redman | 416/97 |
| 3,807,892 | 4/1974 | Frei et al. | 416/97 X |
| 3,809,494 | 5/1974 | Redman | 415/115 |
| 3,864,058 | 2/1975 | Womack | 416/97 R |
| 3,885,609 | 5/1975 | Frei et al. | 415/115 |
| 4,019,831 | 4/1977 | Franklin | 416/97 |
| 4,021,139 | 5/1977 | Franklin | 416/97 |
| 4,026,659 | 5/1977 | Freeman | 416/97 R X |
| 4,135,855 | 1/1979 | Peill | 416/97 R X |
| 4,168,938 | 9/1979 | Dodd | 416/97 R |
| 4,229,140 | 10/1980 | Scott | 416/97 R |

FOREIGN PATENT DOCUMENTS

| | | | |
|---|---|---|---|
| 1078116 | 8/1967 | United Kingdom | 416/97 |
| 1222565 | 2/1971 | United Kingdom | 416/97 |
| 1467483 | 3/1977 | United Kingdom | 416/97 |

*Primary Examiner*—Everette A. Powell, Jr.
*Attorney, Agent, or Firm*—Henry J. Policinski; Derek P. Lawrence; Donald W. Walk

[57] ABSTRACT

A film cooled airfoil body is provided wherein radially spaced apart cooling passages discharge cooling air in a thin continuous film of cooling air along the exterior wall surface of the airfoil body.

1 Claim, 4 Drawing Figures

U.S. Patent  Dec. 1, 1981  4,303,374
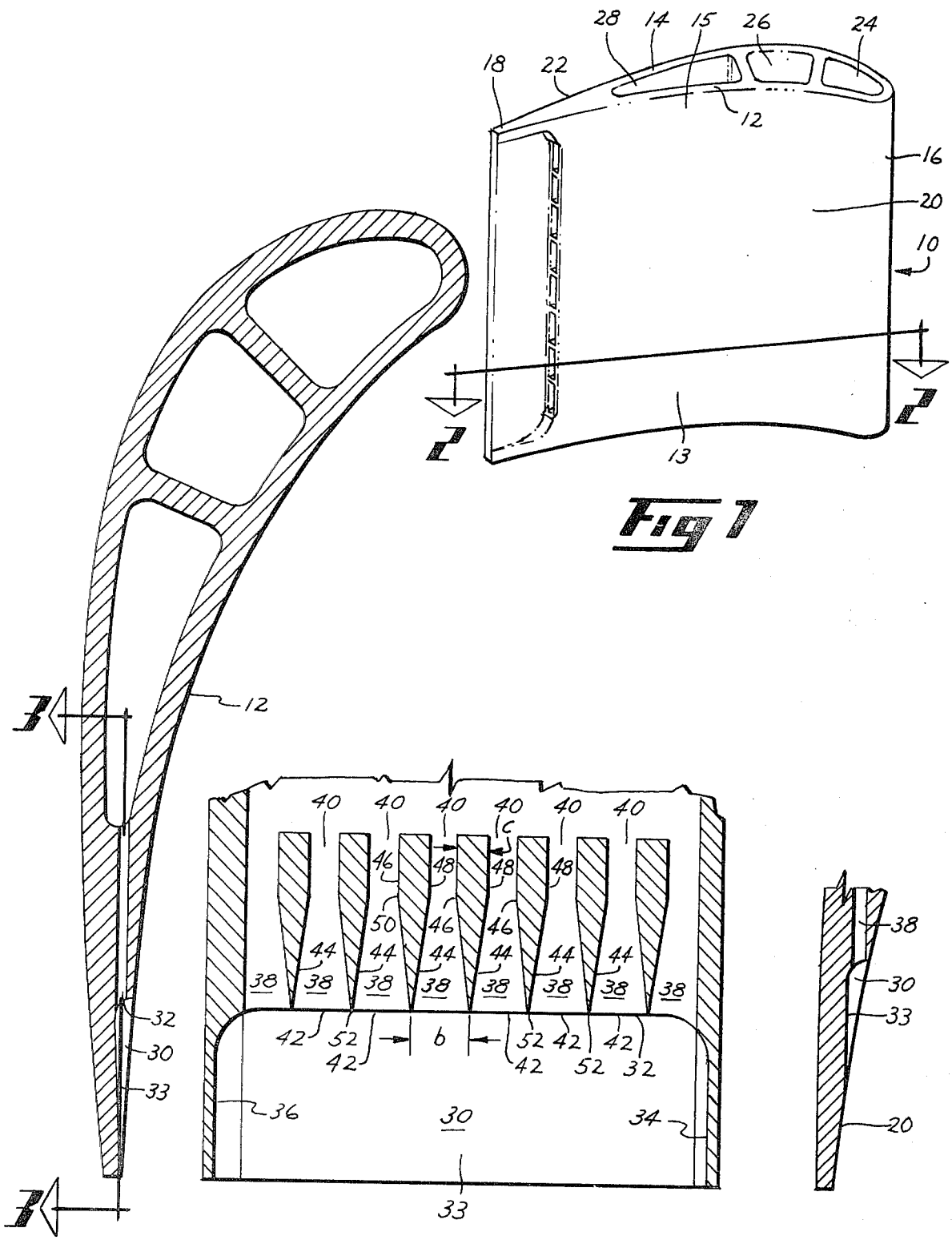

4,303,374

FILM COOLED AIRFOIL BODY

The government has rights in this invention pursuant to Contract No. N00019-77-C-0201 awarded by the Department of the Navy.

BACKGROUND OF THE INVENTION

This invention relates to turbo-machinery and more particularly to film cooled airfoil bodies associated with a gas turbine engine.

It has long been recognized that airfoils, such as turbine blades and vanes operating in the high temperature gas environment of a gas turbine engine, must be cooled by a fluid medium in order to achieve favorable life performance and hence low maintenance and overhaul expense on the engine. It has become common practice to divert air from the compressor section of the engine to a cavity within the airfoil and thence through a series of passages through the walls of the airfoil. Air emerging from the passages is intended to establish a moving film of cooling air between the surface of the airfoil and the hot gases flowing within the engine. The moving film of cooling air is intended to form a barrier between the hot gases and the airfoil surface and hence to inhibit the transfer of heat from the gases to the airfoil surface. The life of the airfoil is consequently enhanced.

The cooling passages associated with prior art devices have been disposed widely spaced-apart from each other over the surface of the airfoil. Thus, the cooling air emerges from the cooling passages in the form of a plurality of discrete jets separated by wakes void of cooling air. Hence, elongated hot streaks appear in the area of the wake where the hot gases flowing in the engine may contact the surface of the airfoil. The airfoil surface is subjected to alternating hot and cool areas which result in the establishment of thermal stress gradients and excessively hot spots and an associated decrease in airfoil life. Some prior art cooling schemes have addressed these shortcomings. By way of example, the device shown in U.S. Pat. No. 3,527,543 discloses the use of diverging cooling passages to provide for the discharge of discrete jets of cooling air that converge toward each other. However, in the device shown in this reference, the spacing between cooling passages at their exit is substantially greater than the width of the passages. Hence, even though the cooling passages are tapered the wakes are not eliminated and the airfoil still suffers from the aforementioned shortcomings. The present invention addresses the elimination of wakes associated with prior art airfoils having a plurality of cooling air passages providing a film of cooling air to the airfoil surface.

Therefore, it is an object of the present invention to provide for a film cooled airfoil wherein the cooling air is introduced over the airfoil surface in the form of a continuous film.

SUMMARY OF THE INVENTION

Briefly stated, this and other objects, which will become apparent from the following description and the accompanying drawings, are accomplished by the present invention which provides in one form, a film cooled airfoil body having a pair of spaced apart walls including concave and convex exterior wall surfaces. At least a pair of spaced apart adjacent cooling passages include an inlet in communication with a cavity of cooling air and an exit for discharging the cooling air along one of the exterior walls in a thin continuous film. A partition is disposed between the passages and includes a pair of oppositely facing passage wall surfaces defining a portion of each of the passages. The spacing between the passage wall surfaces decreases in the downstream direction from a first upstream magnitude to a second downstream magnitude at the passage exit. The aforementioned spacing is substantially less than the width of the passage exit to avoid the formation of wakes in the film.

DESCRIPTION OF THE DRAWINGS

The following description of the preferred embodiment of the present invention will be more readily understood when read in conjunction with the accompanying drawings in which:

FIG. 1 is a perspective view of an airfoil body comprising the present invention.

FIG. 2 is a cross-sectional view of the airfoil body taken along the line 2—2 of FIG. 1.

FIG. 3 depicts a partial cross-sectional view of the airfoil body taken along the line 3—3 of FIG. 2.

FIG. 4 is a cross-sectional view depicting an alternative embodiment of the present invention.

DESCRIPTION OF THE PREFERRED EMBODIMENT

Referring to FIG. 1 a perspective view depicting an airfoil body comprising the present invention is shown generally at 10. For purposes of describing the invention, the term "radially", or the like, shall refer to a direction generally along a line disposed vertically in FIG. 1. The term "axially", or the like, shall refer to a direction generally along a line in the direction of hot gases past airfoil body 10 from the leading edge to the trailing edge. The terms radially and axially have been selected to correspond to describe the airfoil in relation to the normal position it occupies in a gas turbine engine. The terms "upstream" and "downstream" are used herein to denote the relative position of one location with respect to another location relative to a flowing stream of fluid.

Accordingly, airfoil body 10 is comprised of a pair of spaced apart thin walls 12 and 14 which extend radially and axially and join at an upstream end to form leading edge portion 16 of airfoil body 10. Walls 12 and 14 join at a downstream end to comprise trailing edge portion 18 of airfoil body 10. Airfoil body 10 further generally includes radially inner and radially outer ends 13 and 15, respectively.

Concave and convex airfoil surfaces 20 and 22 comprise exterior wall surfaces of walls 12 and 14, respectively, including those portions of walls 12 and 14 which comprise leading and trailing edge portions 16 and 18. Airfoil body 10 further includes a plurality of cavities 24, 26 and 28 extending radially from inner end 13 to outer end 15. Cavities 24, 26 and 28 are disposed adjacent, but axially spaced from, one another between spaced apart walls 12 and 14 and between leading and trailing edge portions 16 and 18. Cooling air from a source of pressurized air (not shown), such as a compressor associated with the gas turbine engine is received by cavities 24, 26, and 28. While a plurality of cavities 24, 26, and 28 have been depicted the film cooling arrangement comprising a part of the present invention will be described as associated with cavity 28. It should be understood, however, that cavities 24 and 26 have equal facility of cooperating with such a film cooling arrangement.

Referring now to FIGS. 2 and 3, the former depicts a cross-sectional view of airfoil body 10 taken along the line 2—2 of FIG. 1 and the latter depicts a partial cross-sectional view of airfoil body 10 taken along the line 3—3 of FIG. 2. Airfoil body 10 includes depression or recess 30 formed in wall 12 and comprising a part of exterior concave surface 20 at trailing edge portion 18. Recess 30 extends substantially radially across airfoil body 10 from its radially outer end 15 to its radially inner end 13. Recess 30 is defined or bounded by, at its most upstream end, radially extending face 32, facing in the downstream direction and extending substantially radially across airfoil body 10, bottom surface 33 and separated side walls 34 and 36. Recess 30 is tapered in the axial direction; that is to say the depth of recess 30 decreases in the downstream direction and bottom surface 33 eventually merges into concave surface 20 at the most downstream extent of recess 30.

A plurality of elongated radially spaced discrete cooling passages 38 are disposed in wall 12 and provide a path for a flow of cooling air from cavity 28 through wall 12. Each passage 38 includes inlet 40 communicating passage 38 with cavity 28. Furthermore, each passage 38 includes an exit 42 through which cooling air is discharged in a direction generally parallel to the flow of hot gases past airfoil body 10. Exit 42 of passage 38 has a radial exit width of preselected magnitude b.

A plurality of partitions 44 separate discrete cooling passages 38 from one another. Each partition 44 is disposed between adjacent cooling passages 38 and includes a pair of generally oppositely facing passage wall surfaces 46 and 48 radially spaced apart from one another and defining a portion of spaced-apart adjacent cooling passages 38. More specifically, each partition 44 includes a passage wall surface 46 which defines one radially facing side of one passage 38 while the same partition 44 includes an oppositely facing passage wall surface 48 which defines one radially facing side of an adjacent passage 38.

Partitions 44 are tapered in the downstream direction. That is to say, the passage surfaces 46 and 48 associated with each partition 44 are radially spaced apart by a spacing width c having a first upstream magnitude proximate the upstream inlet 40. Beginning at location 50, disposed between passage inlet 40 and passage outlet 42, the spacing width c between surfaces 46 and 48 decreases in the downstream direction from the aforementioned first upstream magnitude to a second downstream magnitude. More specifically, the spacing width c between surfaces 46 and 48 at any point downstream of location 50 is less than the spacing width c between surfaces 46 and 48 upstream of location 50. Partitions 44 taper over a substantial portion of their axial extent whereby surfaces 46 and 48 merge gradually. Gradually mergence of surfaces 46 and 48 insures that the cooling air will not separate from the surfaces and hence undesirable turbulence is avoided. Partitions 44 taper in this manner such that opposed surfaces 46 and 48 intersect each other to form a downstream edge 52 on partition 44 proximate the exit 42 of passages 38. The spacing width c between surfaces 46 and 48 at exit 42 is substantially less than the magnitude b of radial width of passage exit 42. Thus the spacing between passages 38 proximate exits 42 is substantially less than the passage width and hence the tendency to form wakes is substantially reduced over prior art devices. In the preferred form, surfaces 46 and 48 intersect proximate exit 42 to form an edge 52 which is knife-like and hence the aforementioned spacing width c between surfaces 46 and 48 at edge 52 is substantially zero.

With edge 52 having a knife-like configuration, the deliterious wakes associated with prior art devices are not formed.

Knife-like edges 52 and passages exits 42 are essentially co-planar with face 32 of recess 30 and hence passages 38 open into recess 30. It is observed, that with partition 44 tapering to terminate at a knife-like downstream edge 52, cooling air emerging from passages 38 through exits 42 is substantially continuous in the radial direction without the presence of wakes associated with prior art devices. Hence a continuous sheet of cooling air attaches to bottom surface 33 of recess 30 to form a moving barrier film to protect surface 33 from the hot gases flowing past airfoil body 10. In this manner then, the trailing edge portion 18 of airfoil body 10 is film cooled.

Referring now to FIG. 4, a slight modification of the preferred embodiment of the present invention shown in FIG. 1 is presented. In FIG. 4, recess 30 is disposed further upstream than depicted in the FIG. 1 embodiment. In all other respects, the structure shown in FIG. 4 is identical to the structure of the preferred embodiment of FIGS. 1, 2 and 3. With recess 30 so disposed, the cooling air emerges from exits 42, flows in a continuous film downstream along bottom surface 33 to the downstream end of recess 30 and attaches to the concave surface 20. The cooling air thence flows over surface 20 in a continuous sheet in a direction away from leading edge portion 16. Hence, the surface 20 is protected from the hot gases flowing past airfoil body 10. It should also be mentioned that a series of axially consecutive recesses 30, each associated with passages connecting the recess 30 with one of interior cavities 24, 26 or 28, may be utilized. In such an arrangement, each recess 30 is disposed at an axial location proximate the area where the cooling film associated with the previous upstream recess 30 begins to lose its effectiveness as a barrier protecting against hot gases.

It will be understood that the preferred embodiments of the present invention are well adapted to attain the aforestated objectives and that various modifications may be made to the preferred embodiment without departing from the scope of the appended claims.

I claim:

1. For use in a gas turbine engine having a hot gas stream flowing therein, a film cooled airfoil body comprising:

a radially and axially airfoil body having leading and trailing edge portions and a pair of spaced-apart walls including axially and radially extending concave and convex exterior wall surfaces;

a radially extending interior cavity disposed between said spaced-apart walls, said cavity adapted to receive cooling air from a source of pressurized air;

a tapered recess disposed in said airfoil body, for carrying a film of cooling air, and comprising a part of one of said exterior wall surfaces at said trailing edge portions, said recess extending substantially radially across said airfoil body and tapering in the downstream direction to provide a recess depth which decreases in the downstream direction, said recess at least partially defined at its most upstream end by a face extending radially substantially across said airfoil body and facing in the downstream direction and further defined by a radially and axially extending recess bottom surface facing said hot gas stream and comprising a part of said one exterior wall surface;

a plurality of radially spaced-apart adjacent cooling passages each having an inlet communicating said passages with said cavity and an exit at said radially extending face, said passage exits providing for the discharge of said cooling air in a thin continuous film along said bottom surface, said film providing a barrier between said bottom surface and said hot gas stream, said passage exit having an exit width of a preselected magnitude; and a plurality of axially extending partitions each disposed between adjacent cooling passages and extending from said cavity to said recess and terminating a knife-like edge co-planar with said radially extending face, each of said partitions further including a pair of generally oppositely facing spaced-apart passage wall surfaces defining at least a portion of adjacent passages, said pair of wall surfaces having a spacing width which decreases from a first upstream magnitude at said inlet to a second downstream magnitude at said knife-like edge, said decreasing spacing width providing for tapering of said partition over a substantial portion of said axial extent thereby permitting said passages to discharge cooling air in a film without the presence of wakes.

* * * * *

UNITED STATES PATENT AND TRADEMARK OFFICE
CERTIFICATE OF CORRECTION

PATENT NO. : 4,303,374
DATED : December 1, 1981
INVENTOR(S) : Bruce T. Braddy

It is certified that error appears in the above-identified patent and that said Letters Patent are hereby corrected as shown below:

Column 6, line 2, after the word "nating" and before "a" -- add the word "in" --

Signed and Sealed this

Sixteenth Day of March 1982

[SEAL]

Attest:

Attesting Officer

GERALD J. MOSSINGHOFF
Commissioner of Patents and Trademarks